United States Patent [19]

Herrera Van Der Nood et al.

[11] Patent Number: 5,721,747
[45] Date of Patent: Feb. 24, 1998

[54] METHOD AND DEVICE FOR DATA TRANSMISSION HAVING IMPROVED ERROR RESILIENCE WITH CONCOMITANT INTEGRITY PROTECTION

[75] Inventors: José Manuel Herrera Van Der Nood, Rotterdam; Eric Simon Trommel, Zoetermeer, both of Netherlands

[73] Assignee: Koninklijke PTT Nederland N.V., Groningen, Netherlands

[21] Appl. No.: 569,922

[22] Filed: Dec. 8, 1995

[30] Foreign Application Priority Data

Dec. 12, 1994 [NL] Netherlands ............... 9402103

[51] Int. Cl.$^6$ ............................................... H03M 13/00
[52] U.S. Cl. ............................................... 371/48; 371/49.1
[58] Field of Search ............... 371/37.1, 53, 48, 371/49.1

[56] References Cited

U.S. PATENT DOCUMENTS

| | | | |
|---|---|---|---|
| 4,654,489 | 3/1987 | Weiss | 380/48 |
| 4,929,946 | 5/1990 | O'Brien et al. | 341/87 |
| 5,093,831 | 3/1992 | Serizawa et al. | 371/37.1 |
| 5,355,412 | 10/1994 | Kangas | 380/23 |

FOREIGN PATENT DOCUMENTS

| | | |
|---|---|---|
| 0191410 | 8/1986 | European Pat. Off. . |
| 9120076 | 12/1991 | WIPO . |
| 9520285 | 7/1995 | WIPO . |

*Primary Examiner*—Stephen M. Baker
*Attorney, Agent, or Firm*—Michaelson & Wallace; Peter L. Michaelson

[57] ABSTRACT

The invention relates to a method for transmitting data in a processed manner on a communication channel, in which a first series (1) of data is converted into a second series (2) of data by means of a first operation (P), the second series (2) of data is transmitted on the communication channel and the second series of data is then converted into a third series (3) of data by means of a second operation ($P^{-1}$). Check data (4) are formed on the basis of the first series (1) and are added to the second series (2). Subsequently, the integrity of the third series (3) is checked using the check data (4). The operations may comprise, respectively, data compression and data decompression. The check data are subjected to a protection operation (S) before they are added to the second series. Preferably, the method takes place at layer 3 of the so-called OSI model. The invention furthermore provides devices for using the method.

18 Claims, 2 Drawing Sheets

5,721,747

METHOD AND DEVICE FOR DATA TRANSMISSION HAVING IMPROVED ERROR RESILIENCE WITH CONCOMITANT INTEGRITY PROTECTION

BACKGROUND OF THE INVENTION

The invention relates to a method and device for transmitting processed data on a communication channel. More particularly, the invention relates to a method for transmitting data in a processed manner on a communication channel, comprising the steps of: converting a first series of data into a second series of data by means of a first operation, generating check data on the basis of the first series, which check data are added to the second series, transmitting the second series of data on the communication channel, converting the second series of data into a third series of data by means of a second operation and checking the integrity of the third series using the check data.

It is known in practice to transmit data in a processed manner. In this connection, the problem arises that errors may occur during the transmission. The received data are corrupted by such transmission errors, as a result of which transmitted "zeros" are received as "ones" and vice versa. At the same time, the corruption is dependent on the operation concerned. In the case of data compression, in particular, errors become apparent not only to a considerable degree in the final (decompressed) data received, but also in the case of encryption, for example, where only a few transmission errors may heavily corrupt a total message of the transmitted data.

This problem arises in particular in adaptive (de)compression of data, wherein the tables, on the basis of which the compression and decompression is performed, became permanently deranged by a transmission error. As a result, it is possible that the entire subsequent message is corrupted by a single transmission error.

Existing communication protocols often have a form of protection against transmission errors. Thus, for example, in the so-called OSI model, an error-correction protocol is laid down at layer 2 in order to be able to use data compression. Such a protocol does not, however, offer a complete protection against errors, such as bit errors, which occur in the transmission since the so-called checksum mechanism incorporated in existing protocols offers only a limited protection against errors.

SUMMARY OF THE INVENTION

The object of the invention is to eliminate the abovementioned and other disadvantages of the prior art and to provide a method for transmitting data in a processed manner, which method offers enhanced protection against transmission errors in the case of compression or other data processing.

In addition, the object of the invention is to provide a method for transmitting processed data, which method makes it possible to carry out an integrity verification on the data.

The object of the invention is furthermore to provide devices and a system for implementing the method.

For this purpose, a method of the type mentioned in the preamble is characterized, according to the invention, by the step of subjecting check data to a protection operation before the check data are added to the second series.

By subjecting the check data to a protection operation, an indirect integrity check of the transmitted data is provided.

The protection operation need not be performed upon the transmitted (compressed) data to be effective against changes in the transmitted data. Any changes in the transmitted (compressed) data, whether wilful or erroneous, will result in a discrepancy between the compressed data and the associated check data. The protection operation effectively inhibits an intentional modification of the check data. Thus, with the method of the present invention a high degree of protection against both transmission errors and deliberate data corruption is effectively obtained.

It should be noted that it is known per se to generate check data, such as parity bits, of data to be transmitted. Such parity bits are, however, always formed on the basis of the transmitted data itself, that is to say of the processed data (second series) if there is a processing operation prior to the transmission. However, the invention envisages using the unprocessed data (first series) for the formation of check data. This has, inter alia, the advantage that the so-called overhead, i.e. the added data, is well defined and can have a fixed length. This makes it possible to guarantee that the transmitted data will fit into a certain window. In the case of, for example, data compression as a processing operation, expansion of the check data due to unfavorable coding can be avoided in this way since the check data itself are not subjected to said operation. Furthermore, the invention envisages to subject the check data to a protection operation, preferably without performing such a protection operation upon the data proper.

If the processing comprises data compression, the formation of check data on the basis of the first (uncompressed) series offers the further advantage that detection perception for check bits (such as parity bits) will be greater over a certain number of bytes in the first series than in the second series. In addition, a check bit itself contains in this way less information, as a result of which the occurrence of a transmission error in a check bit causes less information loss and will therefore have less disadvantageous consequences.

When, according to the invention a protection operation is carried out on the check data, a degree of data protection of the data transmission can be achieved. In the method according to the invention, the formation of check data may take place on the basis of various operations, that is to say not only the formation of parity bits but also, for example, the performance of a so-called hash function. The protection operation may, for example, comprise an enciphering operation or a parity operation.

BRIEF DESCRIPTION OF THE DRAWINGS

The invention will be explained in greater detail below by reference to the figures.

DETAILED DESCRIPTION

Figure 1:
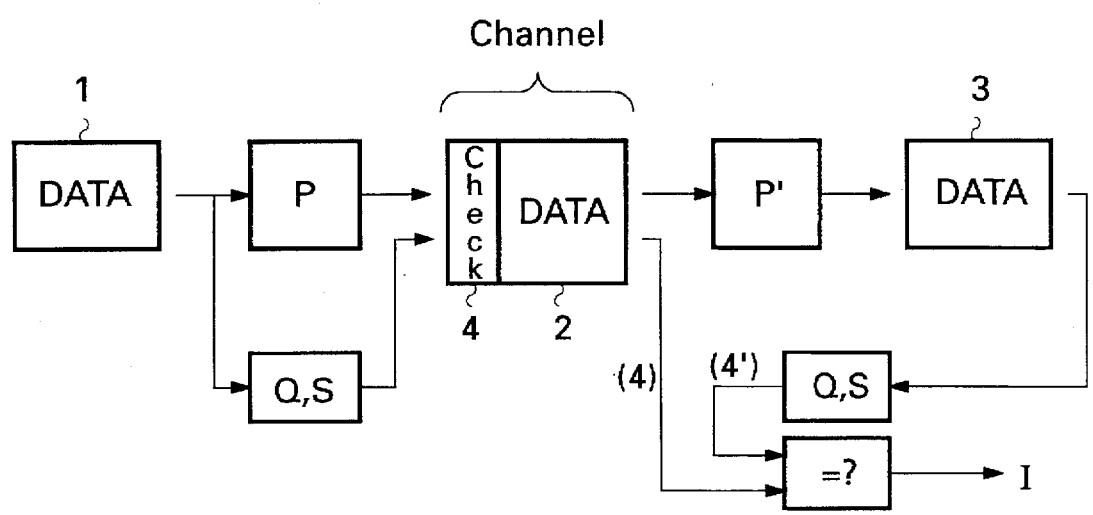
FIG. 1 shows diagrammatically the transmission of data according to the invention.

As is shown diagrammatically in FIG. 1, at the transmitting end (left-hand side in FIG. 1), a first series of data 1 is converted into a second series of data 2 by means of an operation P. The second series is transmitted on a communication channel, diagrammatically indicated by channel after which said second series 2 is converted into a third series 3 at the receiving end (right-hand side in FIG. 1) by a further operation P', which is in most cases the inverse of operation P. If the operation P' is the inverse of P ($P'=P^{-1}$), the third series 3 will completely or at least partially correspond to the first series 1. If the operation P comprises a compression operation the operation $P^{-1}$ is a decompression operation, and the third series 3 will correspond to series 1 if no transmission errors have occurred and no conversion of data format has been carried out.

According to the invention, check data 4 are formed in an operation Q using the first series 1. Said check data are added to the series 2 and transmitted. In this process, the check data 4 may be added to the series 2, for example, in a separate data block, but they may also be incorporated in the series 2 in a dispersed manner by means of interleaving. A combination of grouped and dispersed incorporation is also possible, for example in small groups of 4 bits, the small groups themselves being dispersed over the data of the series 2. As a result of dispersing the check data to a certain degree, a greater degree of protection is obtained against transmission errors occurring in groups, so-called bursts.

The check data may be formed by determining parity data in a known manner. In this case, one parity bit may be formed, for example, per byte of the first series. In general, a small group (for example 1, 2 or 3) of check bits (such as parity bits) will be formed on the basis of a number of bytes of the first series, and said number of bytes will be dependent on the properties of the data and of the communication channel. Thus, in the case of a channel having a small number of errors (small bit error rate BER), one or a few check bits will suffice for a large number (for example, 10 or 20) of data bytes. It is also possible for the check bits to comprise, instead of parity bits, bits which have been formed by another operation Q, for example a so-called hash function.

At the receiving end, check data 4' are likewise formed from the series 3 by an operation Q. Said regenerated check data 4' are compared with the check data 4 incorporated in series 2. The integrity of the series 2 and 3 can be confirmed using this comparison.

Instead of the operation Q to which the third series 3 is subjected, an operation R to which the second series 2 is subjected can optionally be used at the receiving end. In this case, the operation R should have the property that it reconstructs the check data on the basis of the processed data (second series), or at least checks the integrity of the second series using the transmitted check data and the (processed) data of the second series.

In order to provide a form of protection for the series 2 which is transmitted on the communication channel C, the check data 4 are subjected to a protection operation S to form protected check data. In this case, the protected check data, rather than the unprotected check data, would be added with the series 2 and resulting combined series would be transmitted over the communication channel. As a result, it is more difficult for unauthorized third parties to check the integrity of the data transmission (with the aid of the check data 4), with the result that third parties acquire no certainty about the presence of any errors in the data.

The protection operation S may comprise the enciphering of the check data, for example by the (modulo 2) addition of random numbers to the check data. In most cases, it will be necessary under these circumstances to incorporate a starting value in the second series in order to make it possible to decrypt (likewise by modulo 2 addition of the same random numbers) at the receiving end.

A simpler protection operation S comprises, for example, the alternating inversion, or inversion at certain intervals, of the check bits. Optionally, the protection operation S may comprise the addition to the check data of a value read out of a fixed table. Although a lesser degree of protection is thereby achieved, the transmission of a starting value can be avoided.

It will be clear that if an operation S is carried out at the transmitting end on the result of the operation Q, this will also have to take place at the receiving end.

The abovementioned operation P may also comprise an encryption or other coding operation. The operations P, P', Q, R and S may be operations known per se. Suitable operations may be found in e.g. R. N. Williams: "Adaptive Data Compression", Dordrecht, 1991, Chapter 1.16, and F. Rubin: "Cryptographic Aspects of Data Compression Codes", Cryptologia, Vol. 3, No. 4, October 1979.

The first, second and third series may be composed either of bit streams or of series of data packets, and the data packets may have an arbitrary length. Preferably, the first and third series are byte-oriented, and the second series is bit-oriented. Advantageously, the method according to the invention is carried out in such a way that the data are processed separately per channel or per subchannel. In this connection, the first series may contain data from different logic channels which are subjected to different operations (see also International Patent Application WO95/20285, which is herewith incorporated by reference in this text).

The method according to the invention is suitable, in particular, but not exclusively, for providing data compression at layer 3 (network layer) of the OSI model (as described in e.g. F. Mazda (Ed.): "Telecommunications Engineer's Reference Book", Oxford 1993, Chapter 12).

Figure 2:
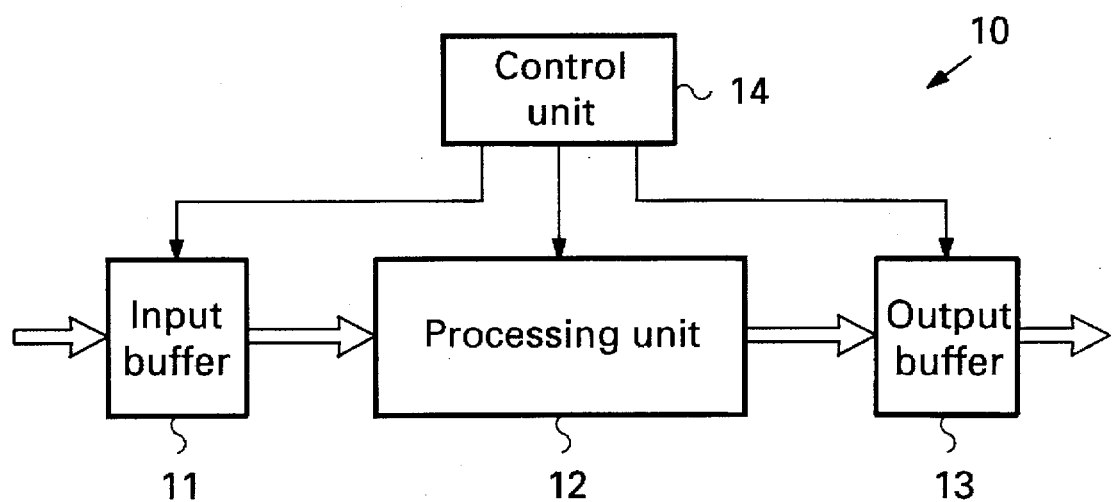
FIG. 2 shows diagrammatically a first device for implementing the invention to be used at a transmitting end of a communication channel.

The device 10 shown in FIG. 2 for implementing the method according to the invention comprises an input buffer 11, a processing unit 12, an output buffer 13 and a control unit 14. Data of the first series (1 in FIG. 1 ) is buffered in the input buffer 11 and then processed in the processing unit 12 (for example compressed) under the control of the control unit 14. The data are then temporarily stored (if necessary) in the output buffer 13 as second series with the addition of check data, and it is then delivered to a communication channel (not shown).

The processing unit 12 comprises processing means, such as a microprocessor, and memory means, such as a random access memory (RAM) and/or a register for temporarily storing intermediate results (for example of a parity operation or a compression process). Suitable software (for example for the operation process) can be stored in a fixed, i.e. read only memory (ROM or EPROM). The control unit 14 which may likewise comprise a microprocessor and memory means (RAM/ROM) for performing, inter alia, the insertion (integration) of the check data into the processed data, for example by feeding the check data to suitable parts of the output buffer 13. The performance of an additional protection operation (S in FIG. 1) may likewise be carried out by the processing means 12, but it may optionally also be carried out by separate additional processing means (not shown). Optionally, the output buffer 13 may be integrated into the processing unit 12.

If the series which are processed with the aid of the device 10 contain data of different (logic) channels or sub-channels, the output buffer may advantageously be provided with separate, channel-related buffer units, as described in International Patent Application WO95/20285.

Figure 3:
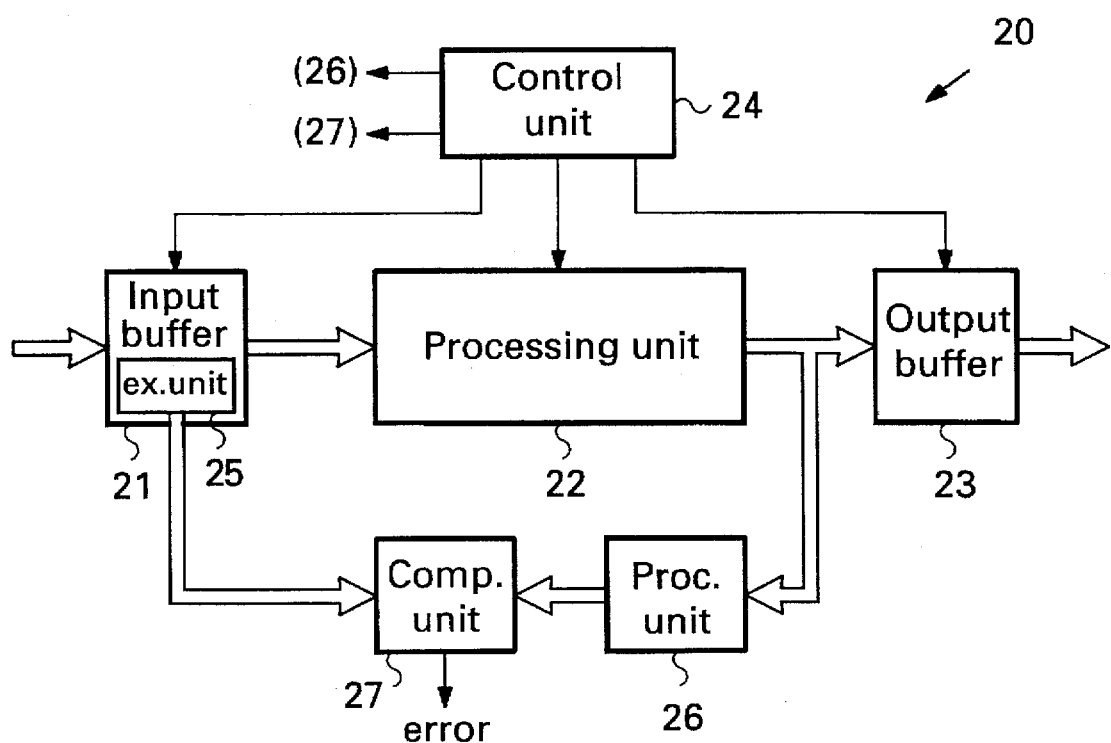
FIG. 3 shows diagrammatically a second device for implementing the invention to be used at a receiving end of a communication channel.

Like the device 10 of FIG. 2, the device 20 of FIG. 3 comprises an input buffer 21, a processing unit 22, an output buffer 23 and a control unit 24, the structure of which may be identical to parts 11–14 respectively, of the device 10. The device 20 is furthermore provided with an extraction unit 25, an additional processing unit 26 and a comparison unit 27. The extraction unit 25, which may be integrated in the input buffer 21, extracts the check data from the received data (second series 2 in FIG. 1). The additional processing unit 26, which may optionally be integrated in the processing unit 22, forms new check data on the basis of the received data and data reprocessed (in inverse form) in the processing unit 22. If a protection operation (S) is carried out at the transmitting end on the original check data, this should also be carried out on the new check data, for example by the addition unit 26, in orden unit 26, in order to make a meaningful comparison possible. The new check data are compared in the comparison unit 27 with the check data which were contained in the received series of data. If the (received) check data are identical to the new check data, this confirms the integrity of the received data and, consequently, the integrity of the series of data (third series 3 in FIG. 1) which is delivered by the output buffer 23. If the (received) and new check data are not identical, an error has occurred in the data transmission. In that case a suitable signal can be delivered by the comparison unit 27. A retransmission of the data concerned, for example, may then be requested.

The devices 10 and 20 of FIGS 2 and 3 can be produced in a manner known to the person skilled in the art from commercially available components. Advantageously, the devices 10 and 20 may be accommodated, separately or together, in one or more application-specific integrated circuits (ASICs).

As has been explained above, the invention provides, inter alia, a method for transmitting data in a processed manner (for example compressed) at layer 3 of the OSI model, an additional protection being offered against the occurrence of transmission errors. In addition, the protection may be used to provide a certain degree of data security without, however, having to subject the data itself to an additional (encryption) process.

It will be understood by those skilled in the art that the invention is not limited to the embodiments shown and that many modifications and additions are possible without departing from the scope of the invention.

We claim:

1. Method for transmitting data in a processed manner on a communication channel, comprising the steps of:

converting a first series (1) of data into a second series (2) of data by means of a first operation (P);

generating check data on the basis of the first series (1);

subjecting the check data to a protection operation (S) so as to produce protected check data (4);

adding said protected check data (4) to the second series (2) so as to form a resulting second series, transmitting the resulting second series of data on the communication channel;

converting the resulting second series of data into a third series (3) of data by means of a second operation ($P^{-1}$); and checking integrity of the third series (3) using the protected check data (4).

2. Method according to claim 1, wherein the checking of the integrity of the third series (3) of data comprises:

regenerating check data on the basis of the third series (3) so as to form regenerated check data (4');

subjecting the regenerated check data (4') to the protection operation (S) so as to form protected regenerated check data; and comparing the protected regenerated check data with the protected check data (4) of the second series.

3. Method according to claim 1, wherein the checking of the integrity of the third series (3) of data comprises:

regenerating check data on the basis of the third series (3) so as to form regenerated check data;

subjecting the protected check data (4) to an inverse of the protection operation (S) so as to form inverted check data; and comparing the inverted check data with the regenerated check data.

4. Method according to claim 1, wherein the protection operation (S) comprises an enciphering operation.

5. Method according to claim 1, wherein the protection operation (S) comprises a parity operation.

6. Method according to claim 1, wherein the protected check data (4) are interleaved with the data (2) of the second series.

7. Method according to claim 1, wherein the data (1) of the first series are associated with a plurality of subchannels, and wherein the data of the first series are separately processed per subchannel.

8. Method according to claim 1, wherein the processing comprises compression of the data.

9. Method according to claim 1, wherein the transmission of data in a processed manner takes place at layer three of an OSI model.

10. Method according to claim 1, wherein the first (1) and third (3) series are constituted by data packets.

11. Device (10) for processing data, comprising:

means (11) for receiving data so as to form received data;

means (12) for processing the received data so as to form processed data, said processing means (12) further being arranged for:

forming check data on the basis of received data;

performing a protection operation (S) on the check data so as to form protected check data; and adding the protected check data to the processed data so as to form data (2) to be transmitted; and means (13) for transmitting the data to be transmitted.

12. Device according to claim 11, wherein the processing means (12) are arranged for compressing data.

13. Device according to claim 11, wherein the processing means (12) are arranged for interleaving the protected check data (4) in the data (2) to be transmitted.

14. Device according to claim 11, accommodated in an application-specific integrated circuit.

15. Device (20) for processing data, the device comprising:

means (21) for receiving data so as to form received data;

means (22) for processing the received data so as to form processed data;

means (23) for transmitting the processed data;

means (25) for extracting first protected check data (4) from the received data;

means (26) for forming second protected check data (4') by forming check data on the basis of the processed data and for performing a protection operation (S) on said check data; and means (27) for comparing the first and second protected check data.

16. Device according to claim 15, wherein the data processing means are arranged for decompressing compressed data.

17. Device according to claim 15, provided with means for processing data per subchannel.

18. Device according to claim 15, accommodated in an application-specific integrated circuit.

* * * * *